United States Patent [19]

Bunn, Jr. et al.

[11] 3,959,117

[45] May 25, 1976

[54] FLUID CATALYTIC CRACKING OF HYDROCARBONS

[75] Inventors: Dorrance Parks Bunn, Jr.; John Curtis Strickland, Houston, both of Tex.

[73] Assignee: Texaco Inc., New York, N.Y.

[22] Filed: July 1, 1974

[21] Appl. No.: 484,371

Related U.S. Application Data

[62] Division of Ser. No. 345,036, March 26, 1973, abandoned.

[52] U.S. Cl. ............................ 208/113; 23/288 S; 208/120; 208/153; 208/164
[51] Int. Cl.² .................. B01J 8/24; C10G 37/06
[58] Field of Search ............. 208/120, 164; 113/153

[56] References Cited
UNITED STATES PATENTS

| | | |
|---|---|---|
| 3,243,265 | 3/1966 | Annesser .......................... 23/288 S |
| 3,492,221 | 1/1970 | Pfeiffer ............................. 208/164 |
| 3,607,730 | 9/1971 | Pfeiffer ............................. 208/164 |
| 3,644,199 | 2/1972 | Evans et al. ...................... 208/120 |

*Primary Examiner*—Delbert E. Gantz
*Assistant Examiner*—G. E. Schmitkons
*Attorney, Agent, or Firm*—T. H. Whaley; C. G. Ries; Douglas H. May, Jr.

[57] ABSTRACT

A transport type fluid catalytic cracking reactor comprising a riser conduit, a flow reversal means and a downcomer conduit, wherein the flow reversal means has a closable top such that a shorter or longer residence time of catalyst and oil vapor in the transport reactor may be selected without affecting vapor velocity within the riser conduit. Also, a process employing such transport reactor.

4 Claims, 1 Drawing Figure

U.S. Patent May 25, 1976 3,959,117
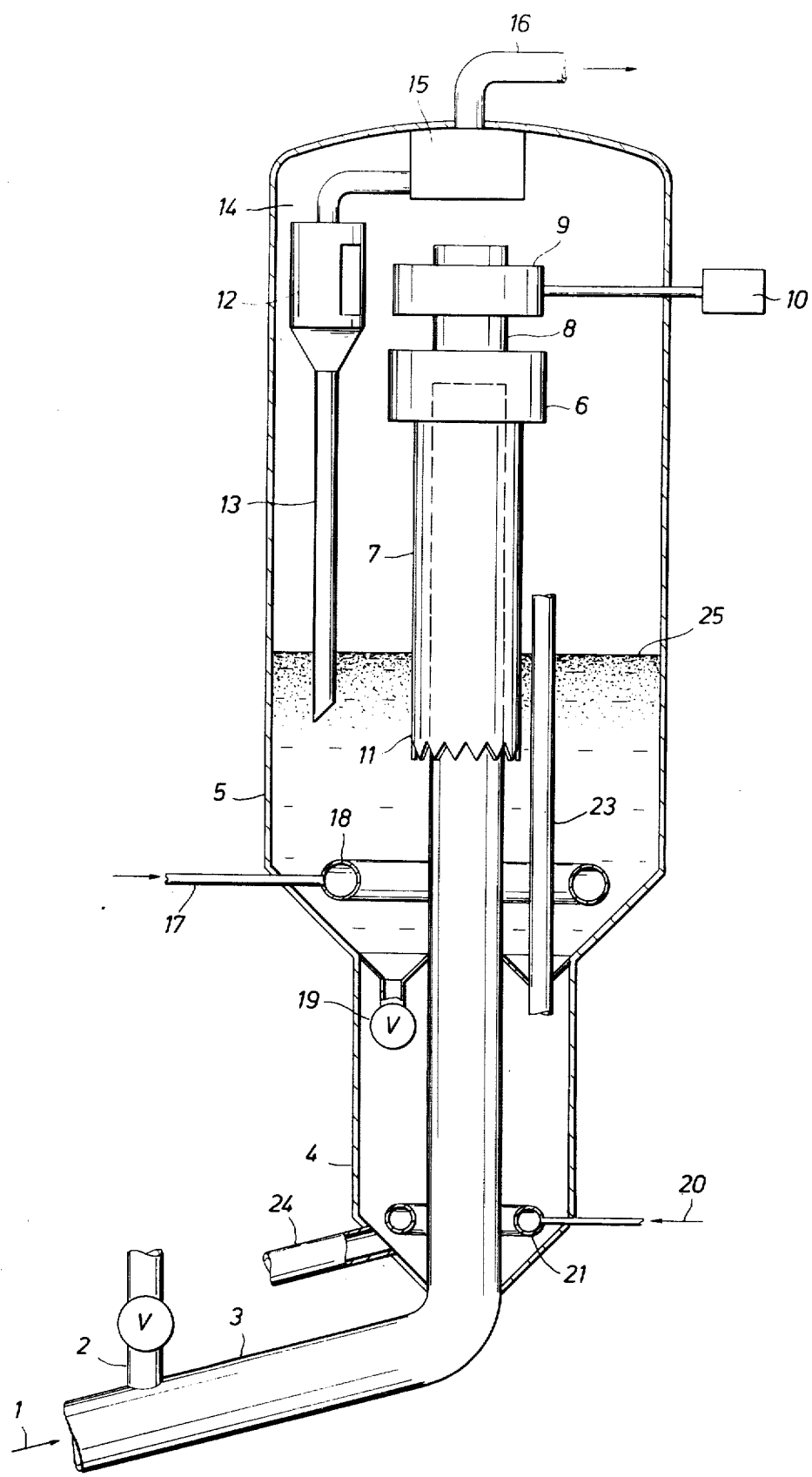

FLUID CATALYTIC CRACKING OF HYDROCARBONS

This is a division of application Ser. No. 345,036, filed Mar. 26, 1973, now abandoned.

FIELD OF THE INVENTION

The present invention relates to improved process and apparatus for cracking of relatively heavy hydrocarbons, such as gas oils, into useful lower boiling products. More particularly, the present invention relates to improved process and apparatus for contacting cracking catalyst as a dispersed dilute phase with hydrocarbon vapor in an elongated reaction conduit at flow velocities sufficient to prevent substantial backmixing of catalyst with additional hydrocarbon vapor.

BACKGROUND OF THE INVENTION

In recent years, improved commercial cracking catalysts have been developed which are highly active for conversion of relatively heavy hydrocarbons into naphtha, lighter hydrocarbons and coke and demonstrate increased selectivity for conversion of hydrocarbon feed, such as gas-oil, into useful liquid products at the expense of gas and coke. One class of such improved catalytic cracking catalysts includes those comprising zeolitic silica-alumina molecular sieves in admixture with amorphous inorganic oxides such as silica-alumina, silica-magnesia and silica-zirconia. Another class of catalysts having such improved characteristics include those widely known as "high alumina" catalysts. Experience gained from using such improved cracking catalysts have shown that maximum benefits from the high conversion activity and improved product selectivity are obtained by maintaining contact of catalyst and hydrocarbon feed for only a limited time of from 1–10 seconds at cracking conditions wherein catalyst is suspended as a dilute phase in a flowing stream of hydrocarbon vapors. Thus, development of these improved fluid catalytic cracking catalyst has led to utilization of dilute phase transfer line reactors wherein a hydrocarbon cracking reaction is carried out with catalyst dispersed in a hydrocarbon vapor stream moving in an elogated reaction conduit with sufficient velocity to keep the catalyst entrained in such vapor as a dilute phase with a minimum of back mixing. Such dilute phase suspensions of catalyst in hydrocarbon vapor may have a density in the range of from 1 to 10 pounds per cubic foot. Accordingly, residence time flexibility inherent to prior art dense phase fluidized bed reaction zones has been sacrificed for the advantages of improved conversion and product selectively obtained with transfer line cracking. However, such residence time flexibility is still desirable for controlling product distribution from a fluid catalytic cracking process.

Cyclic processes for fluid catalytic cracking of hydrocarbon feed streams are well known. The fluid cracking process sequence generally comprises contacting hot regenerated catalyst with hydrocarbon feed in a reaction zone under cracking conditions; separating cracked hydrocarbon vapors from used cracking catalyst; stripping volatile hydrocarbons from said used catalyst with a stripping vapor; regenerating stripped catalyst by burning carbonaceous deposits therefrom with oxygen; and then returning regenerated catalyst for reaction with additional hydrocarbon feed. Hydrocarbon vapors from the reaction step and the stripping step are separated into fractions including a gas product, naphtha, light cycle oil and one or more heavier fractions boiling above the light cycle oil range. Such heavier fractions may be withdrawn as product streams from the cracking process, or may, at least in part, be recycled for further cracking, operating conditions for a fluid catalytic cracking process employing a transfer line reactor having hydrocarbon vapor flowing therethrough with fluidized catalyst dispersed therein as a dilute phase, include regeneration temperatures in the range of about 1,100° to about 1,500°F., regenerator pressure (above the fluidized bed) in the range of about 5–50 psig, transfer line reactor outlet temperatures in the range of 850°–1,200°F., preferably 925°–1,000°F. or higher; reaction zone pressures in the range of 5–50 psig; catalyst to oil weight ratios in the range of 2–20 pounds of catalyst per pound of oil. The cross-sectional area of the transfer line reactor is selected to provide superficial vapor velocities of 15–25 feet per second at the transfer line inlet and of 20–60 feet per second near the outlet. Residence time of reactant vapors in the reaction conduit are preferably in the range of 0.5–10 seconds. Combinations of the above operating conditions may be employed to obtain a hydrocarbon feed conversion in the 60–95 percent range, preferably 75–85%, wherein hydrocarbon feed conversion is defined as that percentage of the hydrocarbon in the feed boiling above about 430°F. which is converted to coke and hydrocarbons boiling below 430°F.

At different seasons, it is often desirable to vary product distribution obtained from a fluidized catalytic crackiing unit. Particularly, it is often desirable to vary the ratio of naphtha to light cycle gas oil obtained. The degree of conversion, which affects such product ratios, is conveniently controlled by adjusting reaction conditions, particularly residence time of catalyst and hydrocarbon vapor in the reaction zone.

Fluid catalytic cracking apparatus is known which employs a transfer line reactors for dilute phase hydrocarbon cracking processes, which reactors are designed to provide flexibility of catalyst-hydrocarbon mixture space velocity under cracking conditions. For example, in U.S. Pat. No. 3,644,199, apparatus and a process are disclosed wherein catalyst-hydrocarbon vapor mixture is admitted into the lower portion of a vertical transfer line reactor comprising an external pipe and an internal concentric pipe open at its lower end and which may be closed at its upper end. The external pipe is fitted with catalyst-hydrocarbon inlet means near its lower end and outlet means near its upper end. The open lower end of the internal concentric pipe terminates above such catalyst-hydrocarbon inlet means and the internal concentric pipe upper end terminates outside the closed upper end of the external pipe. Valve means are provided for closing the upper end of the internal concentric pipe in a controllable manner. Velocity and residence time of catalyst-hydrocarbon mixture in said transfer line reactor are varied by controlling the degree of closure of the upper end of the internal concentric pipe. That is, with the internal pipe closed, catalyst-hydrocarbon mixture can only flow through the annular area between the external and internal pipes; with the internal pipe open, catalyst-hydrocarbon mixture flows at lower velocity and longer residence time through the annular area and the internal pipe. Intermediate velocities and residence time may be obtained by adjusting the degree of closure of the inner concentric pipe.

The disadvantage of this apparatus is that velocity of the catalyst-hydrocarbon mixture varies with the degree of closure of the inner concentric pipe. Under certain flow conditions, the velocity may drop so low that substantial backmixing of catalyst in the hydrocarbon vapor stream may occur, leading to undesired loss in naphtha selectivity and an increase in coke production.

SUMMARY OF THE INVENTION

Now, according to the present invention, an apparatus for dilute phase catalytic cracking of hydrocarbons is disclosed for use in a Fluid Catalytic cracking system. Such apparatus includes an improved elongated, confined transport reaction zone for passing a mixture of hydrocarbon vapors and catalyst therethrough. Such elongated confined transport reaction zone comprises a substantially vertical riser conduit; a flow reversal means attached to the upper end of said riser and having an open lower end and a closable upper end, for changing the direction of flow of hydrocarbon vapor-catalyst mixture exiting the riser conduit; valve means for closing the upper end of said flow reversal means; and a substantially vertical downcomer conduit forming an annulus around said riser conduit for receiving catalyst-hydrocarbon mixture from said flow reversal means.

By employing the apparatus of the present invention, an elongated, confined transport reaction zone is provided for a dilute phase hydrocarbon cracking reaction zone that is compact, having a reduced vertical height and which by selecting an open or closed position for said flow reversal means is of variable length. Residence time of catalyst-hydrocarbon mixtures may conveniently be varied by opening and closing the flow reversal means without affecting velocity within the riser conduit. Thus, degree of conversion of hydrocarbon may be varied by proper selection of residence time and other operating variables without danger of catalyst backmixing with hydrocarbon vapors. The elongated confined reaction zone of the present invention is useful in construction of new fluid catalytic cracking units, as the overall vertical height of the cracking unit may be substantially reduced while maintaining the desired length of transport reaction zone. Additionally, the transport reaction zone of the present invention is particularly useful in modifying existing fluid catalytic cracking units wherein additional length of reaction zone may be added to an existing riser without consuming appreciable space in an existing reaction vessel. These and other advantages of the present invention will be described more fully in the detailed description which follows.

BRIEF DESCRIPTION OF THE DRAWINGS

The drawing is a schematic sectional view of the reaction section of a fluidized catalytic cracking unit showing the elongated transport reaction zone of the present invention in relation to other elements of the fluid cracking reaction section.

DETAILED DESCRIPTION OF THE INVENTION

In a hydrocarbon conversion process employing a fluidized catalyst-hydrocarbon dispersion in a vertical transport reactor, the degree of hydrocarbon conversion may be varied by a controlled change in residence time of the catalyst-hydrocarbon dispersion within the transport reactor under reaction conditions.

This invention may be employed with any catalytic hydrocarbon conversion process utilizing a fluidized reactor system of the transport type wherein such system requires cycling of catalyst to the reactor following suitable stripping and regeneration. This invention is particularly adaptable to the catalytic cracking of petroleum fractions, and the following description will be in terms thereof.

The attached drawing is a schematic representation of the reactor section of a fluidized catalytic cracking unit showing the improved transport reactor conduit of the present invention in relation to other elements of the reaction section. Many elements commonly employed in a commercial fluidized cracking unit, but which are unnecessary to show the invention herein, have been omitted for the sake of clarity. Such omitted elements may readily be supplied by one skilled in the art. It is to be understood that the drawing and the description which follows are for the purpose of illustration only and are not intended as limitations upon the present invention. Other embodiments of the present invention coming within the scope of the appended claims will be obvious to those skilled in the art.

In the drawing, riser conduit 3 has a hydrocarbon inlet line 1 and a regenerated catalyst inlet 2 at the lower end thereof. Riser conduit 3 extends vertically upward through stripping section 4 into reaction vessel 5 wherein the upper end of riser conduit 3 terminates within the hollow cylindrical body of flow reversal means 6. An upper portion of riser conduit 3 extending into reaction vessel 5 is surrounded by downcomer conduit 7, as will hereinafter be described.

Flow reversal means 6 comprises a vertical, hollow cylinder having a top and bottom. Attached to the top of flow reversal means 6 is outlet nipple 8 which is concentric with, and the same diameter as riser conduit 3. Downcomer 7 is attached to the bottom of flow reversal means 6 and is concentric with riser conduit 3. Riser conduit 3 terminates at a distance below the top of flow reversal means 6 at least equal to ¼ the diameter of riser conduit 3. Preferably riser conduit 3 extends above the bottom of flow reversal means 6 by a distance equal to ¼ the diameter of riser conduit 3, although this last dimension is not critical for the present invention.

In outlet nipple 8, valve means 9 is mounted such that nipple 8 is closable. Activator means 10, mounted externally to reactor vessel 5 is attached to valve means 9 such that opening and closing of nipple 8 may be effected from a position external to reactor vessel 5. Valve means 9 may be any convenient valving arrangement which can be activated to open and close outlet 8, such as for example, a plug valve, slide valve, gate valve, etc. Downcomer conduit 7 is of a diameter such that the cross sectional area of the annular space between it and riser conduit 3 is at least equal to the internal cross-sectional area of riser conduit 3, and preferably the annular cross-section area is about twice the cross-section area of riser conduit 3.

The diameter of flow reversal means 6 is at least as large as the diameter of downcomer conduit 7, and preferably is such that the distance from the cylinder wall of flow reversal means 6 to the wall of downcomer conduit 7 is at least equal to the distance from downcomer conduit 7 to riser conduit 3, although such dimension is not critical to the present invention.

The preferred dimensions given for spacing between riser conduit 3, downcomer conduit 7 and flow reversal means 6 have been selected such that excessively high vapor velocities do not occur within the interior of flow reversal means 6. Flow reversal means 6 is positioned such that the top and bottom thereof are perpendicular to the flow of catalyst and hydrocarbon in riser conduit 3, and the cylinder wall of flow reversal means 6 is perpendicular to its top and bottom. In this manner, a substantial portion of high velocity catalyst particles pass upwardly from riser conduit 3 and enter outlet nipple 8. If outlet nipple 8 is in an open position, catalyst and hydrocarbon vapor pass through valve means 9 into reactor vessel 5. If closed, a relatively dead space is formed in outlet nipple 8 in which vapor velocities are quite low such that catalyst particles may accumulate and thereby form a cushion to protect valve means 9 from erosion by impingement of additional high velocity catalyst particles. With outlet nipple 8 closed, vapors from riser conduit 3 are forced into the body of flow reversal means 6 from which they then flow into the annular space between riser conduit 3 and downcomer 7. The volume and cross-section area of flow reversal means 6 are sufficiently large to avoid excessively high vapor velocities therein. Catalyst particles and vapor which have lost their vertical component of velocity in flow reversal means 6 pass from above the outlet of riser conduit 3 and strike the wall of flow reversal means 6 at an angle of about 90°. Minimum erosion of a surface occurs when the impingement angle of catalyst particles is about 90°. Catalyst and hydrocarbon vapor from flow reversal means 6 passes into the annular space between downcomer 7 and riser conduit 3. From the lower end of downcomer 7, catalyst and hydrocarbon vapors are discharged into reactor vessel 5. The lower end of downcomer 7 terminates in a plurality of evenly spaced distribution deflectors 11 which comprise triangular shaped extension to downcomer 7 and which define a plurality of "V" shaped notches in the bottom edge of downcomer 7. Catalyst particles flowing downwardly in downcomer 7 have a momentum component which tends to continue their downward direction while the hydrocarbon vapor tends to flow outward through the "V" shaped notches. Thus separation of hydcocarbon vapor from catalyst is enhanced.

The diameter and length of riser conduit 3 and downcomer 7 are selected such that the residence time of a catalyst-hydrocarbon mixture at reaction temperatures and pressures is in the range of from about 0.5-10 seconds, and preferably 2-6 seconds, at superficial vapor velocities in the range of 10-60 feet per second. Preferably, the diameter and length of downcomer 7 is selected such that it accounts for between ⅓ and ½ of the residence time of the catalyst-hydrocarbon mixture. In this situation a substantial decrease in residence time may be obtained by opening valve means 9, thus allowing the catalyst-hydrocarbon mixture to bypass downcomer 7 and providing greater flexibility to a fluid catalytic cracking system.

In operation, preheated hydrocarbon feed from line 1 and hot regenerated catalyst from line 2 enter the lower end of riser conduit 3 wherein the catalyst is suspended as a dilute phase in a flowing hydrocarbon vapor stream. The hydrocarbon vapor-catalyst mixture, having a superficial velocity in the range of 10-60 feet per second flows upward through riser conduit 3 under cracking conditions including transport reactor outlet temperatures in the range of 800°-1,200°F., preferably 925°-1,100°F., catalyst to oil weight ratio of 2-20, and pressure in the range of 5-55 psig.

In the operation with valve means 9 closed, the hydrocarbon vapor-catalyst mixture discharges from riser conduit 3 into flow reversal means 6. In flow reversal means 6, the flow direction of the hydrocarbon vapor-catalyst mixture is reversed 180°. From flow reversal means 6, the hydrocarbon vapor-catalyst mixture enters downcomer 7 from which the mixture discharges into reaction vessel 5. In this mode of operation, hydrocarbon vapor and catalyst are maintained in contact under dilute phase cracking conditions for a relatively longer time within the 0.5-10 second residence time range, thus the hydrocarbon undergoes a relatively large degree of conversion. In the drawing, the lower end of downcomer 7 is shown located below the upper surface 25 of a fluidized dense phase bed of catalytic cracking catalyst. Hydrocarbon vapors leaving downcomer 7 thus pass upwardly through the fluidized catalyst bed and disengage the fluidized bed at its upper surface 25. Under such operating conditions, hyrocarbon vapors leaving downcomer 5 are subjected to additional cracking within the dense phase fluidized catalyst bed. If it is determined that hydrocarbon cracking be limited to dilute catalyst phase cracking, the inventory of fluidized catalyst within reaction vessel 5 may be reduced such that the upper surface 25 of the fluidized dense phase catalyst bed is below the lower end of downcomer 7.

In the alternative operation mode, with valve means 9 open, it is preferable that the upper surface 25 of the dense phase fluidized catalyst bed be above the lower end of downcomer 7 sufficiently to form a fluid seal which will prevent any substantial flow through downcomer 7. The hydrocarbon vapor-catalyst mixture flowing from the upper end of riser conduit 3 enters outlet nipple 8 and flows through valve means 9 into reactor vessel 5. In reactor vessel 5, the superficial vapor velocity decreases substantially and catalyst particles fall into the fluidized catalyst bed, thus separating from hydrocarbon vapors. In this mode of operation, the reaction path is shortened, as downcomer 7 is bypassed. Consequently the residence time of the hydrocarbon vapor-catalyst mixture is likewise shortened. By this means, the degree of hydrocarbon conversion is decreased while maintaining vapor velocities in riser conduit 3 at a rate sufficient to maintain the dilute phase suspension of catalyst in hydrocarbon vapor with substantially no backmixing.

For operation either with valve means 9 open or closed, hydrocarbon vapors above fluidized bed surface 25 flow into cyclone separator 12 for separation of any entrained catalyst therefrom. Separated catalyst from cyclone separator 12 is returned to the fluidized bed via dip leg 13 and hydrocarbon vapors substantially free of catalyst are passed via line 14 into plenum 15. It is to be understood that cyclone separator 12 as shown is representational only, and such separator may comprise a plurality of such cyclone separators in series and paralleled configuration as required to give substantially complete separation of hydrocarbon vapors from entrained catalyst.

From plenum 15, hydrocarbon vapors pass via line 16 to product separation facilities, not shown, wherein the cracked hydrocarbon vapors are separated into product fractions including a gas fraction, a naphtha fraction, a light cycle oil fraction, and one or more fractions higher boiling than light cycle oil. Such higher boiling fractions may be recovered as products of the process or may be recycled, in whole or in part, to the fluid cracking process for additional conversion.

Steam from line 17 enters primary steam ring 18 from which it passes into the fluidized catalyst bed. Steam from the primary steam ring serves to maintain the fluidized state of the catalyst bed and in addition strips a substantial portion of volatile hydrocarbons from the spent catalyst contained within the fluidized bed.

From reactor vessel 5, catalyst passes through slide valve 19 into stripping zone 4. Steam from line 20 enters steam ring 21 from which the steam is distributed into the lower portion of stripping zone 4. Thus, additional volatile hydrocarbons are stripped from the spent catalyst. Stripping effluent vapor comprising steam and hydrocarbon passes from stripper 4 via stripper vent line 23 into reactor vessel 5 wherein such stripping vapors are released above the upper surface 25 of the fluidized catalyst bed. Stripped catalyst from stripping section 4 is withdrawn via line 24 and transferred to a regeneration zone, not shown. In the regeneration zone, stripped catalyst containing non volatile carbonaceous deposits, e.g. coke, is regenerated by burning such carbonaceous deposits with an oxygen containing gas, such as air. Regenerated catalyst from the regeneration zone is returned via line 2 to the lower portion of riser conduit 3 for contact with additional hydrocarbon feed, as herein above described.

The transport reactor contemplated herein comprising riser conduit 3, flow reversal means 6, and downcomer conduit 7, may be completely or partially contained within fluidized cracking reaction vessel 5, which serves as a zone for further cracking of hydrocarbons and/or as a catalyst-hydrocarbon vapor disengaging zone. The transport reactor of the present invention is particularly useful where it is desired to convert an existing fluidized catalytic cracking unit into one which utilizes dilute phase cracking of hydrocarbons and wherein it is desired to limit modifications of the cracking unit to the reaction side and wherein the reaction vessel is already in existence.

In flowing streams comprising hydrocarbon vapors and catalyst particles wherein the velocity is sufficient to maintain the catalyst particles suspended as a dilute phase, erosion of transfer line interior surfaces must be considered. The maximum potential for erosion occurs within the flow reversal means 6 of the transport reactor zone of the present invention. In flow reversal means 6, catalyst particles exiting riser conduit 3 impinge directly upon the top of flow reversal means 6. It has been observed that erosion by impingement of catalyst particles may be substantially reduced when the angle of impingement is about 90° to the surface being impinged. Consequently, flow reversal means 6, as disclosed in the present invention is designed such that catalyst impingment upon the interior surfaces thereof is maintained at about 90° throughout the process of reversing the direction of flow of the catalyst-hydrocarbon vapor mixture. Additionally, it has been noted that erosion of surfaces by impingement of catalyst particles may be substantially reduced by employing a refractory lining upon the surface being impinged. Consequently, it is within the contemplation of this invention that the interior surfaces of flow reversal means 6 be covered by a refractory material.

In the practice of the present invention, suitable hydrocarbon charge stocks to the fluidized conversion reaction include virgin atmospheric gas-oils, vacuum gas-oils, heavy naphthas, deasphalted oil, residual fractions, shale oils and cycle oils derived from any of these. Such hydrocarbon charge stocks may be employed singly or in combination.

Suitable catalysts include those comprising refractory metal oxides having hydrocarbon conversion activity and which may be effectively regenerated under the selected conditions. Examples of catalyst include silica-alumina, silica-magnesia, and silica zirconia. With particular regard to catalytic cracking, preferred catalysts include those combinations of silica-alumina containing 10–50 weight percent alumina, and their admixtures with crystalline zeolitic alumino-silicates commonly known as "molecular sieves". Suitable "molecular sieves" include both naturally occurring and synthetic aluminosilicates such as faujasite, chabozite, X-type and Y-type aluminosilicate molecular sieves. The alkali metal ions of such molecular sieves are exchanged in large part for ammonium, hydrogen, divalent metal, or rare earth metal ions by known techniques so that the sodium ion content is less than about 1.0 wt. percent.

The process arrangement disclosed herein is effective for varying the degree of cracking of a selected feedstock, and also affords a degree of flexibility when employing segregated feedstocks exhibiting different susceptibilities to catalytic cracking. This process scheme is also useful where either fresh feed rate or through put rate may vary significantly at intervals and a substantially constant degree of conversion is desired.

EXAMPLES

The following examples are illustrative of the present invention but are not intended as limitations on its reasonable scope.

EXAMPLE I

A virgin gas oil, derived from West Texas Sour crude is pumped into the lower end of a vertical riser together with heavy cycle gas-oil equivalent to 20 vol. percent of the virgin gas-oil, and regenerated silicaalumina molecular sieve cracking catalyst is mixed with the hydrocarbon charge to provide a dilute phase dispersion of catalyst in hydrocarbon vapor. The fluid dispersion at an average velocity of 30 feet per second exits the vertical riser into a flow reversing means having a closed top. From the flow reversing means the dilute phase dispersion flows into a downcomer conduit having a volume equal to one-half the riser conduit volume. The dilute phase dispersion at a final velocity of 15 feet per second and at a temperature of 960°F. and an apparent space velocity of 4.0 barrels of virgin gas-oil per 5.62 cubic feet of transport reactor volume, discharges from the downcomer conduit into a reactor vessel in which catalyst is separated from hydrocarbon vapor. Gas-oil conversion is 80 volume percent of the feed and naphtha yield is 62 volume percent.

EXAMPLE II

The process of Experiment 1 is repeated, except the top of the flow reversal means is open, and no flow or dispersed phase passes through the downcomer. Thus, at an apparent velocity of 30 feet per second, a temperature of 960°F. and apparent space velocity of 6.0 barrels of virgin gas-oil per 5.62 cubic feet of transport reactor volume, the dilute phase dispersion exits the top of the flow reversal means into the reactor vessel for separation of catalyst from hyrocarbon vapor. Conversion of gas-oil is 60 volume percent and naphtha yield is 50 volume percent.

Thus it can be seen from the examples, by employing the method and apparatus of the present invention, conversion of gas-oil may be varied in a controlled manner to vary the amount of naphtha produced. Velocities in the dilute phase transfer line reactor are also maintained sufficient to prevent backmixing of catalyst with additional hydrocarbon, thus maintaining the desirable catalyst conversion and selectivity characteristics obtained in a dilute phase transport reactor process.

From the above it can be seen that an improved transport reactor has been disclosed for use in a fluidized catalytic cracking unit, which reactor is simple in construction, is of reduced elevation, and occupies a minimum amount of space. The above description of the improved reactor is for a preferred embodiment thereof and many changes and modifications which are within the spirit and scope of the present invention will be obvious to those skilled in the art. Therefore, no limitation upon the improved transport reactor of the present invention is intended other than limitations contained in the appended claims.

We claim:

1. A fluidized catalytic cracking process for conversion of hydrocarbon stock in the presence of a fluidizable cracking catalyst, at cracking conditions, in a vertical, elongated transport reaction zone comprising a vertical riser zone in open communication with a flow reversal zone having a closable top and a vertical downcomer zone in open communication with said flow reversal zone wherein severity of said hydrocarbon conversion is regulated at constant superficial vapor velocity in said transport reaction zone by selectively opening and closing the top of said flow reversal zone.

2. The process of claim 1 wherein residence time of hydrocarbon-catalyst fluidized mixture in the transport reaction zone is in the range of from about 0.5 second to about 3.0 seconds with the flow reversal top in an open position and from about 1.0 second to about 6 seconds with the flow reversal zone top in a closed position.

3. The process of claim 2 wherein the top of said flow reversal zone is in communication with the upper, portion of a reactor vessel, wherein said downcomer zone is in communication with the lower portion of said reactor vessel, wherein a dense phase fluidized bed of cracking catalyst is maintained in the lower portion of said reactor vessel, and wherein the upper surface of said fluidized bed is maintained above the discharge of said downcomer zone when the top of said flow reversal zone is in the open position for inhibiting flow of catalyst and hydrocarbon vapor through said downcomer zone.

4. The process of claim 3 wherein the hydrocarbon stock is a gas-oil range petroleum fraction, wherein cracking conditions in the transport reaction zone include a temperature in the range of from about 850°F to about 1100°F, a catalyst to oil weight ratio in the range of from about 2.0 lb/lb to about 20.0 lb/lb, a pressure in the range of about 5 psig to about 55 psig, and superficial vapor velocity in the range of from about 20 feet per second to about 60 feet per second.

* * * * *